(12) United States Patent
Okamoto et al.

(10) Patent No.: US 7,813,756 B2
(45) Date of Patent: Oct. 12, 2010

(54) MOBILE COMMUNICATION SYSTEM, USER EQUIPMENT IN MOBILE COMMUNICATION SYSTEM, CONTROL PROGRAM THEREOF, AND TRANSMISSION POWER CONTROL METHOD IN MOBILE COMMUNICATION SYSTEM

(75) Inventors: Etsuhiro Okamoto, Osaka (JP); Yukihiko Okumura, Yokohama (JP); Tetsuro Kitayama, Katsushika-ku (JP)

(73) Assignee: NTT DoCoMo, Inc., Chiyoda-ku (JP)

( * ) Notice: Subject to any disclaimer, the term of this patent is extended or adjusted under 35 U.S.C. 154(b) by 478 days.

(21) Appl. No.: 11/953,421

(22) Filed: Dec. 10, 2007

(65) Prior Publication Data

US 2008/0176574 A1 Jul. 24, 2008

(30) Foreign Application Priority Data

Dec. 11, 2006 (JP) ............................. 2006-333352
Nov. 26, 2007 (JP) ............................. 2007-304652

(51) Int. Cl.
*H04B 7/00* (2006.01)
*H04Q 7/20* (2006.01)

(52) U.S. Cl. ........................ 455/522; 455/13.4; 455/69; 455/127.1

(58) Field of Classification Search .............. 455/426.1, 455/426.2, 434, 455, 13.4, 522, 69, 127.1
See application file for complete search history.

(56) References Cited

U.S. PATENT DOCUMENTS

| 6,434,130 | B1 * | 8/2002 | Soininen et al. ............. 370/331 |
| 2002/0115464 | A1 * | 8/2002 | Hwang et al. ............... 455/522 |
| 2006/0035661 | A1 * | 2/2006 | Niwano et al. .............. 455/522 |

FOREIGN PATENT DOCUMENTS

| JP | 2003-318818 A | 11/2003 |
| JP | 2004-274117 A | 9/2004 |
| JP | 2005-5762 A | 1/2005 |
| JP | 2006-319462 A | 11/2006 |

* cited by examiner

*Primary Examiner*—Tuan A Pham
(74) *Attorney, Agent, or Firm*—Crowell & Moring LLP

(57) ABSTRACT

In a W-CDMA wireless system, when communication is performed by using a StandAlone-DCCH, adequate transmission power control is performed depending on change in a communication status. In a W-CDMA wireless system 1, a reception quality of a common channel is measured, and if a StandAlone-DCCH state has occurred, transmission power control corresponding to the common channel is performed in which a target SIR is determined depending on the reception quality of the common channel. Therefore, even in the StandAlone-DCCH state in which Blind transport format detection is used, it is possible to set the target SIR in accordance with a reception status of a user equipment 20, enabling the adequate transmission power control depending on the change in the communication status.

20 Claims, 3 Drawing Sheets

MOBILE COMMUNICATION SYSTEM, USER EQUIPMENT IN MOBILE COMMUNICATION SYSTEM, CONTROL PROGRAM THEREOF, AND TRANSMISSION POWER CONTROL METHOD IN MOBILE COMMUNICATION SYSTEM

BACKGROUND OF THE INVENTION

1. Field of the Invention

The present invention relates to a mobile communication system for providing communication services to user equipments, the user equipment in the mobile communication system, a control program thereof, and a transmission power control method in the mobile communication system.

2. Description of the Related Art

In recent years, a mobile communication system using W-CDMA (Wideband-Code Division Multiple Access) has been used as a multiple access method.

In the mobile communication system using the W-CDMA (hereinafter appropriately referred to as "W-CDMA wireless system"), transmission power control is performed for maintaining a communication quality to a predetermined level.

Moreover, in various environments, in order to more stably maintain the communication quality, closed-loop transmission power control having a double-loop structure consisting of inner loop control and outer loop control may be performed as the transmission power control.

FIG. 3 is a schematic diagram showing a concept of the closed-loop transmission power control having the double-loop structure.

As shown in FIG. 3, in the closed-loop transmission power control having the double-loop structure, in the inner loop control, an instruction for causing a transmission power to increase or decrease is issued with respect to an opposite base station so that a Signal to Interference Ratio of a received radio signal (received SIR) in a user equipment (UE) matches a received SIR to be targeted (target SIR). Moreover, in the outer loop control, the target SIR in the inner loop control is caused to increase or decrease so that a received Block Error Rate (received BLER) of user data in the user equipment matches a received BLER to be targeted (target BLER).

Here, in a stand-alone communication state (StandAlone-DCCH state) using Blind transport format detection as is prescribed in 3GPP 25.212 Annex-A, a state occurs in which only a DCCH is set and a DTCH is not set.

Specifically, when a call button is depressed on the user equipment in an IDLE state, a state occurs in which Radio Resource Control (RRC) has been established in a connection procedure performed between the user equipment and the base station. At this time, only the DCCH has been set as a dedicated physical channel, and the DTCH has not been set in this state. Moreover, the user equipment performs the Blind transport format detection with respect to the DCCH.

Next, in a subsequent connection procedure, Radio Access Bearer (RAB) is established.

Then, in addition to the DCCH, the DTCH is set and the connection procedure is completed.

In this connection procedure, the state in which only the DCCH is set and the DTCH is not set is the above described stand-alone communication state.

In this stand-alone communication state, since a CRC (Cyclic Redundancy Check) is not transmitted, the BLER in the received signal cannot be calculated. In other words, the user equipment performs a process of constantly waiting for data, and if a result of the CRC is OK, determining that there is the data, and decoding received data. Therefore, if the DTCH has not been set, the result of the CRC cannot be determined. Consequently, also the BLER cannot be measured.

Thus, a situation occurs in which the above described outer loop control for matching the received BLER with the target BLER cannot be performed.

With respect to such a situation, as a method of determining the target SIR in the stand-alone communication state, there have been proposed a method of fixedly using a particular target SIR value which has been previously defined, in a StandAlone-DCCH period (see JP2003-318818A), and a method of determining the target SIR based on a received data error rate of a pilot signal in a dedicated physical control channel (DPCCH) (see JP2004-274117A).

However, if the fixed value which has been previously defined as the target SIR in the outer loop control is used, since the target SIR is not changed, a power more than or equal to a certain level is not requested even though a reception quality has deteriorated, and thereby a situation occurs in which data transmission and reception are failed. Conversely, an excessive transmission power is requested even though the reception quality has been improved, and thereby a situation occurs in which power consumption is increased or interference to another communication is caused.

Moreover, if the target SIR is determined based on the received data error rate of the pilot signal in the dedicated physical control channel, since the pilot signal in the dedicated physical control channel (DPCCH) is discretely transmitted and an information amount is limited, the target SIR to be set may not be an appropriate value.

Here, as a method of updating the target SIR in the StandAlone-DCCH period by the outer loop control, a method of transmitting a signal attached only with the CRC from the base station to the user equipment and measuring the BLER of a dedicated channel even if there is no control information is conceivable. However, the signal is transmitted even though there is no control information, which causes unnecessary power consumption, and also, although a CRC check has been completed at one time, the number of CRC checks increases twice in the Blind transport format detection under a condition of the StandAlone-DCCH.

In this way, it has been difficult to perform adequate transmission power control depending on a communication status if the Blind transport format detection is used in the stand-alone communication state.

SUMMARY OF THE INVENTION

It is an object of the present invention to perform adequate transmission power control depending on a communication status if Blind transport format detection is used in a stand-alone communication state.

In order to achieve the above described object, the present invention is a mobile communication system, including a base station having a predetermined communicable area and a user equipment which communicates with the above described base station if the user equipment belongs to the above described communicable area, the above described base station and the above described user equipment communicating with each other via a common channel commonly used by multiple user equipments (for example, a CPICH in a W-CDMA wireless system) and a dedicated channel individually set for each user equipment (for example, a DCH in the W-CDMA wireless system), the above described user equipment performing transmission power control for causing a transmission power in the above described base station to change based on a reception quality of a data transfer channel in the dedicated channel (for example, a DTCH in the W-CDMA wireless system), and the above described user equipment includes common channel reception quality measurement means which measures a reception quality of a channel in which a predetermined code is continuously transmitted, among the above described common channel (for example, a common channel quality measurement unit 22 of FIG. 1), stand-alone state detection means which detects whether or not there is a stand-alone communication state in which the data transfer channel in the dedicated channel has not been set and control information is transmitted and received only via a control channel in the dedicated channel (for example, a DCCH in the W-CDMA wireless system) (for example, a control unit 24 of FIG. 1 which executes a flowchart shown in FIG. 2), and stand-alone-period transmission power control means which, if the above described stand-alone communication state has been detected by the above described stand-alone state detection means, performs transmission power control corresponding to the common channel (for example, transmission power control corresponding to the common channel of FIG. 2) for causing the transmission power in the above described base station to change based on the reception quality of the common channel measured by the above described common channel reception quality measurement means (for example, the control unit 24 of FIG. 1 which executes the flowchart shown in FIG. 2), and that the above described base station changes the transmission power of the dedicated channel with respect to the above described user equipment, depending on the transmission power control performed by the above described user equipment.

Moreover, the present invention is a user equipment in a mobile communication system, the above described mobile communication system including a base station having a predetermined communicable area and the user equipment which communicates with the above described base station if the user equipment belongs to the above described communicable area, the above described base station and the above described user equipment communicating with each other via a common channel commonly used by multiple user equipments and a dedicated channel individually set for each user equipment, the above described user equipment performing transmission power control for causing a transmission power in the above described base station to change based on a reception quality of a data transfer channel in the dedicated channel, and the above described user equipment includes common channel reception quality measurement means which measures a reception quality of a channel in which a predetermined code is continuously transmitted, among the above described common channel, stand-alone state detection means which detects whether or not there is a stand-alone communication state in which the data transfer channel in the dedicated channel has not been set and control information is transmitted and received only via a control channel in the dedicated channel, and stand-alone-period transmission power control means which, if the above described stand-alone communication state has been detected by the above described stand-alone state detection means, performs transmission power control corresponding to the common channel for causing the transmission power in the above described base station to change based on the reception quality of the common channel measured by the above described common channel reception quality measurement means.

Moreover, the present invention is a control program of a user equipment in a mobile communication system, the above described mobile communication system including a base station having a predetermined communicable area and the user equipment which communicates with the above described base station if the user equipment belongs to the above described communicable area, the above described base station and the above described user equipment communicating with each other via a common channel commonly used by multiple user equipments and a dedicated channel individually set for each user equipment, the above described user equipment performing transmission power control for causing a transmission power in the above described base station to change based on a reception quality of a data transfer channel in the dedicated channel, and the above described control program causes a computer to realize a common channel reception quality measurement function of measuring a reception quality of a channel in which a predetermined code is continuously transmitted, among the above described common channel, a stand-alone state detection function of detecting whether or not there is a stand-alone communication state in which the data transfer channel in the dedicated channel has not been set and control information is transmitted and received only via a control channel in the dedicated channel, and a stand-alone-period transmission power control function of, if the above described stand-alone communication state has been detected by the above described stand-alone state detection function, performing transmission power control corresponding to the common channel for causing the transmission power in the above described base station to change based on the reception quality of the common channel measured by the above described common channel reception quality measurement function.

Moreover, the present invention is a transmission power control method in a mobile communication system, the above described mobile communication system including a base station having a predetermined communicable area and a user equipment which communicates with the above described base station if the user equipment belongs to the above described communicable area, the above described base station and the above described user equipment communicating with each other via a common channel commonly used by multiple user equipments and a dedicated channel individually set for each user equipment, the above described user equipment performing transmission power control for causing a transmission power in the above described base station to change based on a reception quality of a data transfer channel in the dedicated channel, and the above described transmission power control method includes, in the above described user equipment, a common channel reception quality measurement step of measuring a reception quality of a channel in which a predetermined code is continuously transmitted, among the above described common channel, a stand-alone state detection step of detecting whether or not there is a stand-alone communication state in which the data transfer channel in the dedicated channel has not been set and control information is transmitted and received only via a control channel in the dedicated channel, and a stand-alone-period transmission power control step of, if the above described stand-alone communication state has been detected in the above described stand-alone state detection step, performing transmission power control corresponding to the common channel for causing the transmission power in the above described base station to change based on the reception quality of the common channel measured in the above described common channel reception quality measurement step, and that the above described transmission power control method includes, in the above described base station, a transmission power changing step of changing the transmission power of the dedicated channel with respect to the above described user equipment, depending on the transmission power control performed by the above described user equipment.

According to these inventions, the reception quality of the common channel is measured, and if the stand-alone communication state has occurred, the transmission power control corresponding to the common channel for causing the transmission power in the base station to change depending on the reception quality of the channel in which the predetermined code is continuously transmitted, among the common channel, is performed.

Therefore, even if the Blind transport format detection is used in the stand-alone communication state, it is possible to perform the transmission power control in accordance with a reception status of the user equipment, enabling the adequate transmission power control depending on change in the communication status.

Moreover, the present invention the above described stand-alone state detection means detects the above described stand-alone communication state, in a state in which Radio Resource Control has been established, if Radio Access Bearer has not been established.

Therefore, a period from when the Radio Resource Control (RRC) has been established until when the Radio Access Bearer (RAB) has been established can be certainly detected as the stand-alone communication state.

It should be noted that, in the user equipment, whether or not the Radio Access Bearer has been established can be determined based on whether or not Radio Access Bearer Setup information (Radio Bearer Setup signal) transmitted from the base station in a connection procedure has been received.

Moreover, the present invention the above described common channel reception quality measurement means measures a reception quality of a common pilot channel as the above described common channel.

This common pilot channel is always broadcasted to each user equipment and used in the user equipment to measure a time base of the base station, and code spreading has not been performed therein. Thus, the common pilot channel can be easily acquired in the user equipment. Therefore, if the dedicated channel becomes the stand-alone communication state and a reception quality of the dedicated channel cannot be measured, it is possible to use the common pilot channel, which can be constantly set as a basis for showing a reception state, to adequately estimate the reception quality of the dedicated channel.

Moreover, the present invention the above described common channel reception quality measurement means measures a received RSCP as the reception quality of the above described common channel.

Therefore, it is possible to use a parameter which is normally measured, to easily determine the reception quality of the common channel at low cost.

Moreover, the present invention the above described common channel reception quality measurement means measures a received Ec/NO as the reception quality of the above described common channel.

Therefore, it is possible to use a parameter which is normally calculated, to easily determine the reception quality of the common channel at low cost.

Moreover, the present invention the above described common channel reception quality measurement means measures a received bit error rate as the reception quality of the above described common channel.

Therefore, it is possible to use a parameter which is normally measured, to easily determine the reception quality of the common channel at low cost.

Moreover, the present invention the above described common channel reception quality measurement means measures a received SIR as the reception quality of the above described common channel.

Therefore, it is possible to determine the reception quality of the common channel based on a parameter which is normally used to determine the reception quality in the transmission power control.

Moreover, the present invention further includes common channel reception quality storage means which stores a result of the measurement by the above described common channel reception quality measurement means when the above described stand-alone communication state has been detected, and the above described stand-alone-period transmission power control means compares the measurement result stored by the common channel reception quality storage means with a measurement result which is subsequently measured by the above described common channel reception quality measurement means, and performs the transmission power control based on a result of the comparison.

Therefore, it is possible to perform the transmission power control in which the change in the communication status is more adequately reflected.

According to the present invention, even if the Blind transport format detection is used in the stand-alone communication state, it is possible to perform the transmission power control in accordance with the reception status of the user equipment, enabling the adequate transmission power control depending on the change in the communication status.

DETAILED DESCRIPTION OF THE PREFERRED EMBODIMENTS

An embodiment of a W-CDMA wireless system applied with the present invention will be described below with reference to the drawings.

Figure 1:
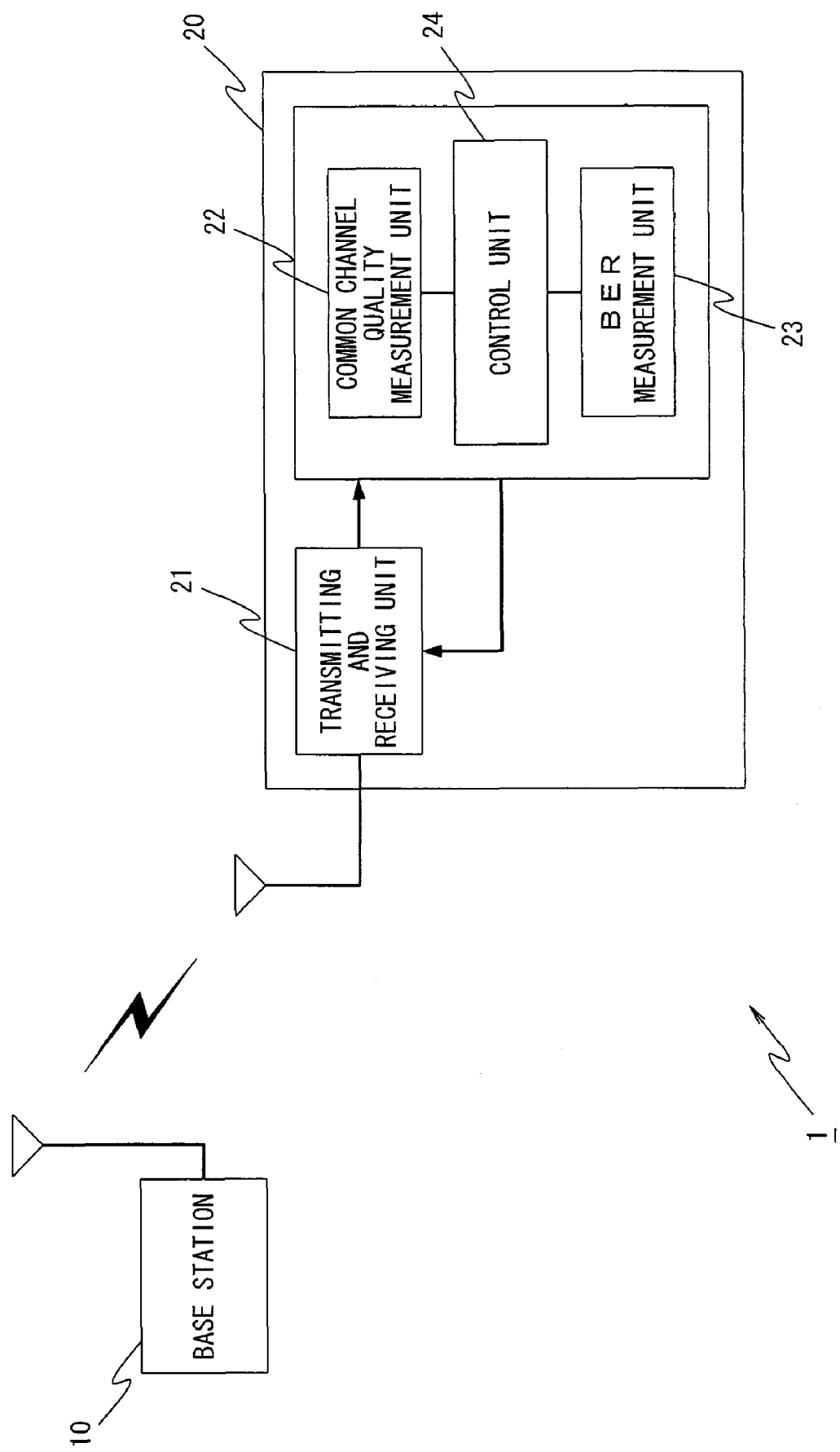
FIG. 1 is a schematic diagram showing a base station and a user equipment in a W-CDMA wireless system 1 according to the present invention.

FIG. 1 is a schematic diagram showing a base station and a user equipment in a W-CDMA wireless system 1 according to the present invention.

In FIG. 1, the W-CDMA wireless system 1 includes a base station 10 and a user equipment 20.

The base station 10 is provided with a base station function in a mobile communication system using W-CDMA.

Specifically, the base station 10 establishes communication based on the W-CDMA with the user equipment 20 in a communicable area of the base station 10, and communicates with the user equipment 20 via physical channels including a common pilot channel (CPICH), a common control physical channel (CCPCH) and a dedicated physical channel (DPCH).

Among these channels, the common pilot channel is a channel for continuously transmitting a scrambling code (PN code) of the base station 10, and this channel is broadcasted to all user equipments 20.

The common control physical channel is a channel for transmitting BCH information, control information such as a paging signal, or low rate user data.

One dedicated physical channel is assigned to each user equipment 20, and the dedicated physical channel is a channel for transmitting and receiving the user data. Moreover, a DCH (Dedicated CHannel) in a transport channel is assigned to the dedicated physical channel, and furthermore, a DCCH (Dedicated Control CHannel) and a DTCH (Dedicated Traffic CHannel) in logical channels are assigned to the DCH.

The base station 10 transmits and receives the user data with respect to the user equipment 20 via the DTCH, and transmits and receives the control information via the DCCH.

The user equipment 20 is provided with a transmitting and receiving unit 21, a common channel quality measurement unit 22, a BER (Bit Error Rate) measurement unit 23 and a control unit 24. It should be noted that the user equipment 20 is provided with a CPU (Central Processing Unit), a main memory, a nonvolatile storage device and a display device as hardware, and the CPU reads various programs stored in the nonvolatile storage device and executes the programs to realize various functions.

The transmitting and receiving unit 21 performs frequency conversion or a demodulation process and data decomposition based on the W-CDMA with respect to a radio signal received via an antenna, and outputs a result of the process to the control unit 24. Also, the transmitting and receiving unit 21 performs data multiplexing or a modulation process and the frequency conversion based on the W-CDMA with respect to a signal inputted from the control unit 24, and transmits a result of the process via the antenna.

The common channel quality measurement unit 22 measures a reception quality of a common channel (common pilot channel) in the communication between the base station 10 and the user equipment 20, and outputs a result of the measurement to the control unit 24. The common pilot channel is used in the user equipment 20 to measure a time base of the base station 10, and code spreading has not been performed therein. Thus, the common pilot channel can be easily acquired in the user equipment 20.

Here, the reception quality measured by the common channel quality measurement unit 22 can be, for example, an RSCP (Received Signal Code Power), a received Ec/N0 (desired signal-to-noise power ratio), a received bit error rate (BER), an SIR or the like.

The BER measurement unit 23 measures the BER of the dedicated physical channel, and outputs a result of the measurement to the control unit 24.

The control unit 24 controls the entire user equipment 20, measures a received SIR of the dedicated physical channel based on the BER measurement result inputted by the BER measurement unit 23, and compares a result of the measurement with a threshold set for transmission power control in a non-StandAlone-DCCH state (hereinafter referred to as "normal transmission power control"). If the received SIR which has been measured is higher than the threshold, the control unit 24 transmits the control information (TPC bits) for causing a transmission power in the base station 10 to decrease by a set value. Moreover, if the received SIR which has been measured is lower than the threshold, the control unit 24 transmits the control information for causing the transmission power in the base station 10 to increase by the set value.

Furthermore, the control unit 24 detects whether or not a StandAlone-DCCH state (stand-alone communication state) has occurred in which the DTCH in the dedicated physical channel has not been set and only the control information via the DCCH is transmitted and received. At this time, in a connection procedure between the base station 10 and the user equipment 20, in a state in which Radio Resource Control (RRC) has been established, if Radio Access Bearer (RAB) has not been established, the control unit 24 detects the stand-alone communication state. Whether or not the Radio Access Bearer has been established can be determined based on whether or not Radio Access Bearer Setup information (Radio Bearer Setup signal) transmitted from the base station 10 to the user equipment 20 in the connection procedure has been received.

It should be noted that, if the StandAlone-DCCH state has occurred, Blind transport format detection as is prescribed in 3GPP 25.212 Annex-A may be performed.

Moreover, the control unit 24 executes a transmission power control process for the StandAlone-DCCH state which will be described later, and compares the reception quality of the common channel inputted by the common channel quality measurement unit 22 with a threshold set for the transmission power control using the reception quality of the common channel (hereinafter referred to as "common channel threshold") (hereinafter, the transmission power control process for the StandAlone-DCCH state will be referred to as "transmission power control corresponding to the common channel"). If the reception quality of the common channel is higher than the common channel threshold, the control unit 24 transmits the control information (TPC bits) for causing the transmission power in the base station 10 to decrease by the set value. Moreover, if the reception quality of the common channel is lower than the common channel threshold, the control unit 24 transmits the control information for causing the transmission power in the base station 10 to increase by the set value.

It should be noted that, if there is no StandAlone-DCCH state, the control unit 24 transmits the control information in accordance with the normal transmission power control to the base station 10, and if there is the StandAlone-DCCH state, the control unit 24 transmits the control information in accordance with the transmission power control corresponding to the common channel, to the base station 10.

Next, operations of the W-CDMA wireless system 1 will be described.

Figure 2:
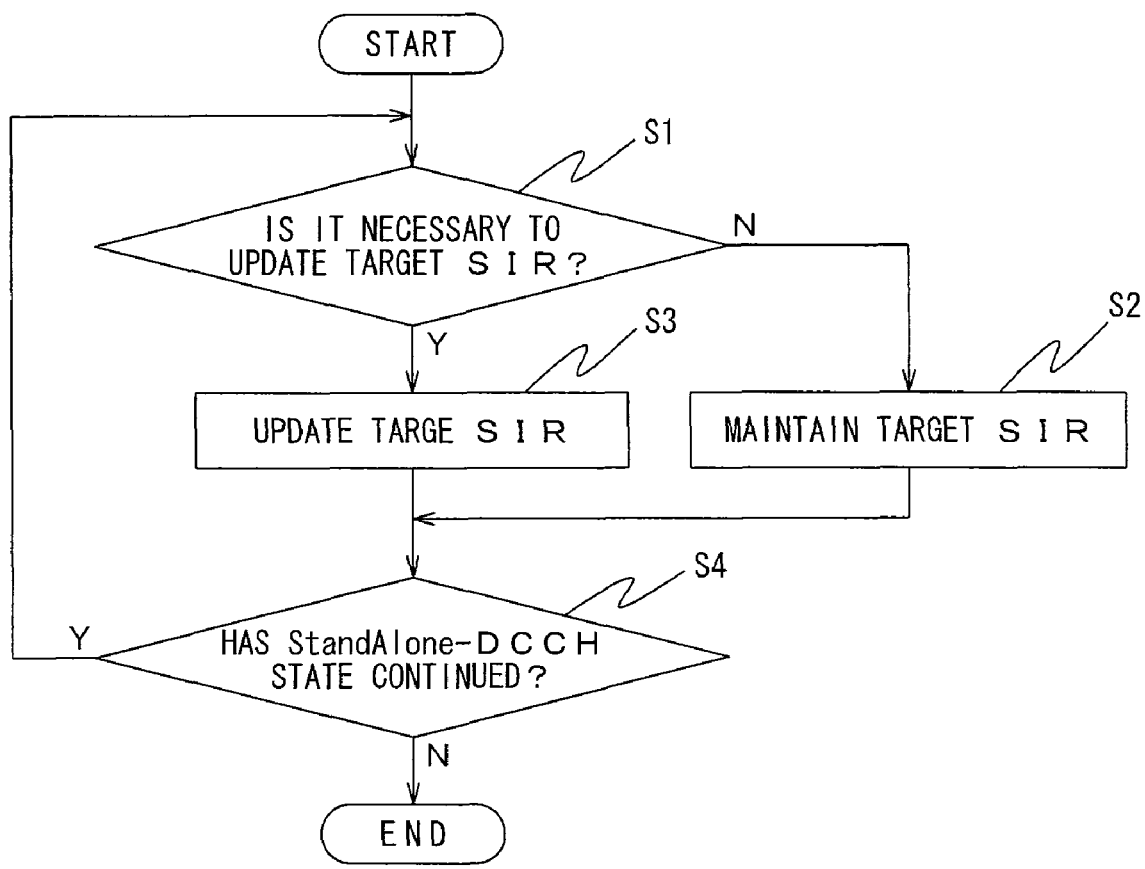
FIG. 2 is a flowchart showing a transmission power control process for a StandAlone-DCCH state executed by a control unit 24.
Figure 3:
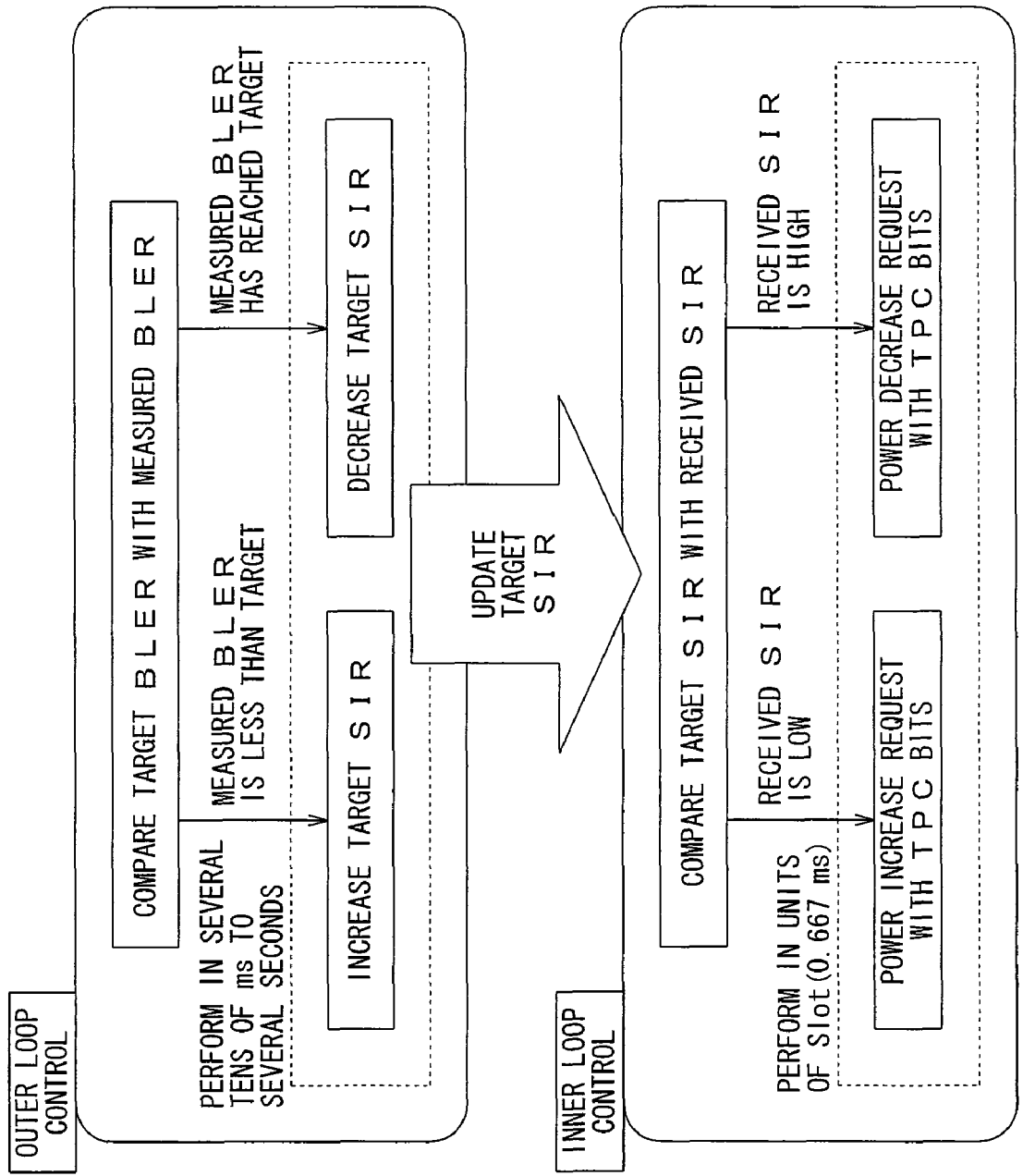
FIG. 3 is a schematic diagram showing a concept of closed-loop transmission power control having a double-loop structure.

FIG. 2 is a flowchart showing the transmission power control process corresponding to the common channel executed by the control unit 24.

The transmission power control process corresponding to the common channel is started correspondingly to the detection of the StandAlone-DCCH state by the control unit 24.

When the transmission power control process corresponding to the common channel is started, the control unit 24 determines whether or not it is necessary to change a target SIR, that is, determines a height of the reception quality of the common channel with respect to the common channel threshold (step S1).

At step S1, if it is determined that it is not necessary to change the target SIR (for example, the reception quality of the common channel matches the common channel threshold), the current target SIR is maintained (step S2).

On the other hand, at step S1, if it is determined that it is necessary to change the target SIR (for example, the reception quality of the common channel is higher or lower than the common channel threshold), the control unit 24 updates the current target SIR depending on a relationship between the common channel threshold and the reception quality of the common channel, and causes the target SIR to increase or decrease (step S3).

After steps S2 and S3, the control unit 24 determines whether or not the StandAlone-DCCH state has continued (step S4). If it is determined that the StandAlone-DCCH state has continued, the process proceeds to step S1, and if it is determined that the StandAlone-DCCH state has not continued, the transmission power control process corresponding to the common channel is completed.

According to the above described operations, if there is no StandAlone-DCCH state, a normal transmission power control process (the transmission power control process based on a reception quality of the dedicated physical channel) is performed, and if there is the StandAlone-DCCH state, the transmission power control process corresponding to the common channel (the transmission power control process based on the reception quality of the common channel) is performed.

As described above, in the W-CDMA wireless system 1 according to this embodiment, the reception quality of the common channel is measured, and if the StandAlone-DCCH state has occurred, the transmission power control corresponding to the common channel is performed in which the target SIR is determined depending on the reception quality of the common channel.

Therefore, even in the StandAlone-DCCH state in which the Blind transport format detection is used, it is possible to set the target SIR in accordance with a reception status of the user equipment 20, enabling adequate transmission power control depending on change in a communication status.

Moreover, when the common pilot channel is used as this embodiment, since the code spreading has not been performed in the common pilot channel, the common pilot channel can be easily acquired in the user equipment 20 and thereby can be an appropriate basis for determining the reception quality.

(Application 1)

In the description of the above described embodiment, the reception quality of the common channel is measured, and the target SIR is determined based on the reception quality at each timing. However, a common channel reception quality storage unit which stores the reception quality of the common channel when the StandAlone-DCCH state has occurred (that is, at the time when a state has occurred in which the DTCH has not been set) can be provided in the control unit 24, and the control unit 24 can compare the reception quality of the common channel inputted by the common channel quality measurement unit 22 with the reception quality stored by the common channel reception quality storage unit, and determine the target SIR depending on a difference between them.

Thereby, it is possible to perform the transmission power control in which the change in the communication status is more adequately reflected.

(Application 2)

In the control unit 24, as a method of updating the target SIR based on the reception quality of the common channel, it is possible to estimate the received SIR of the DCCH in consideration of an Ec/NO and a path loss of the CPICH as well as a received RSCP and an SF of the dedicated channel (DCH), thereby determine a divergence from the target SIR, and then change the target SIR if the divergence is large, and maintain the target SIR if the divergence is small. As a method of estimating the received SIR of the DCCH, it is possible to use a logical conversion method or a method of estimating the received SIR of the DCCH based on an experimental value or an empirical value.

Specifically, as a method of determining the reception quality of the common channel, it is possible to use such a method as the following example:

if a current Ec/NO of the dedicated channel is +1 dB to +2 dB with respect to the Ec/NO before T seconds, the target SIR is set to the target SIR−1 dB;

if the current Ec/NO of the dedicated channel is −1 dB to −2 dB with respect to the Ec/NO before T seconds, the target SIR is set to the target SIR+1 dB;

if the current Ec/NO of the dedicated channel is −2 dB to −3 dB with respect to the Ec/NO before T seconds, the target SIR is set to the target SIR+2 dB; and if the current Ec/NO of the dedicated channel is −1 dB to +1 dB with respect to the Ec/NO before T seconds, and if the Ec/NO of the CPICH is −4 dB to −8 dB, the target SIR is maintained.

Moreover, it is possible to have a method as follows:

if the current Ec/NO of the dedicated channel is −2 dB to 0 dB, the target SIR is set to the target SIR−1 dB;

if the current Ec/NO of the dedicated channel is −8 dB to −10 dB, the target SIR is set to the target SIR+1 dB; and if the current Ec/NO of the dedicated channel is −10 dB to −12 dB, the target SIR is set to the target SIR+2 dB.

Furthermore, it is possible to have a method as follows:

if the current Ec/NO of the dedicated channel is +1 dB to +2 dB with respect to the Ec/NO before T seconds, and the current path loss is −1 dB to −3 dB with respect to the path loss before T seconds, the target SIR is set to the target SIR −1 dB;

if the current Ec/NO of the dedicated channel is −1 dB to −2 dB with respect to the Ec/NO before T seconds, and the current path loss is +1 dB to +3 dB with respect to the path loss before T seconds, the target SIR is set to the target SIR+1 dB; and if the current Ec/NO of the dedicated channel is −2 dB to −3 dB with respect to the Ec/NO before T seconds, and the current path loss is +3 dB to +6 dB with respect to the path loss before T seconds, the target SIR is set to the target SIR+2 dB.

What is claimed is:

1. A mobile communication system, comprising a base station having a predetermined communicable area and a user equipment which communicates with said base station if the user equipment belongs to said communicable area, said base station and said user equipment communicating with each other via a common channel commonly used by multiple user equipments and a dedicated channel individually set for each user equipment, said user equipment performing transmission power control for causing a transmission power in said base station to change based on a reception quality of a data transfer channel in the dedicated channel, wherein said user equipment comprises:

common channel reception quality measurement means which measures a reception quality of a channel in which a predetermined code is continuously transmitted, among said common channel;

stand-alone state detection means which detects whether or not there is a stand-alone communication state in which the data transfer channel in the dedicated channel has not been set and control information is transmitted and received only via a control channel in the dedicated channel; and stand-alone-period transmission power control means which, if said stand-alone communication state has been detected by said stand-alone state detection means, performs transmission power control corresponding to the common channel for causing the transmission power in said base station to change based on the reception quality of the common channel measured by said common channel reception quality measurement means, and wherein said base station changes the transmission power of the dedicated channel with respect to said user equipment, depending on the transmission power control performed by said user equipment.

2. The mobile communication system according to claim 1, wherein said stand-alone state detection means detects said stand-alone communication state, in a state in which Radio Resource Control has been established, if Radio Access Bearer has not been established.

3. The mobile communication system according to claim 1, wherein said common channel reception quality measurement means measures a reception quality of a common pilot channel as said common channel.

4. The mobile communication system according to claim 1, wherein said common channel reception quality measurement means measures a received RSCP as the reception quality of said common channel.

5. The mobile communication system according to claim 1, wherein said common channel reception quality measurement means measures a received Ec/NO as the reception quality of said common channel.

6. The mobile communication system according to claim 1, wherein said common channel reception quality measurement means measures a received bit error rate as the reception quality of said common channel.

7. The mobile communication system according to claim 1, wherein said common channel reception quality measurement means measures a received SIR as the reception quality of said common channel.

8. The mobile communication system according to claim 1, further comprising common channel reception quality storage means which stores a result of the measurement by said common channel reception quality measurement means when said stand-alone communication state has been detected,
wherein said stand-alone-period transmission power control means compares the measurement result stored by the common channel reception quality storage means with a measurement result which is subsequently measured by said common channel reception quality measurement means, and performs the transmission power control based on a result of the comparison.

9. A user equipment in a mobile communication system, said mobile communication system comprising a base station having a predetermined communicable area and the user equipment which communicates with said base station if the user equipment belongs to said communicable area, said base station and said user equipment communicating with each other via a common channel commonly used by multiple user equipments and a dedicated channel individually set for each user equipment, said user equipment performing transmission power control for causing a transmission power in said base station to change based on a reception quality of a data transfer channel in the dedicated channel,
wherein said user equipment comprises:
common channel reception quality measurement means which measures a reception quality of a channel in which a predetermined code is continuously transmitted, among said common channel;
stand-alone state detection means which detects whether or not there is a stand-alone communication state in which the data transfer channel in the dedicated channel has not been set and control information is transmitted and received only via a control channel in the dedicated channel; and
stand-alone-period transmission power control means which, if said stand-alone communication state has been detected by said stand-alone state detection means, performs transmission power control corresponding to the common channel for causing the transmission power in said base station to change based on the reception quality of the common channel measured by said common channel reception quality measurement means.

10. A computer readable medium having stored therein a control program of a user equipment in a mobile communication system, said mobile communication system comprising a base station having a predetermined communicable area and the user equipment which communicates with said base station if the user equipment belongs to said communicable area, said base station and said user equipment communicating with each other via a common channel commonly used by multiple user equipments and a dedicated channel individually set for each user equipment, said user equipment performing transmission power control for causing a transmission power in said base station to change based on a reception quality of a data transfer channel in the dedicated channel,
wherein said control program causes a computer to realize:
a common channel reception quality measurement function of measuring a reception quality of a channel in which a predetermined code is continuously transmitted, among said common channel;
a stand-alone state detection function of detecting whether or not there is a stand-alone communication state in which the data transfer channel in the dedicated channel has not been set and control information is transmitted and received only via a control channel in the dedicated channel; and
a stand-alone-period transmission power control function of, if said stand-alone communication state has been detected by said stand-alone state detection function, performing transmission power control corresponding to the common channel for causing the transmission power in said base station to change based on the reception quality of the common channel measured by said common channel reception quality measurement function.

11. A transmission power control method in a mobile communication system, said mobile communication system comprising a base station having a predetermined communicable area and a user equipment which communicates with said base station if the user equipment belongs to said communicable area, said base station and said user equipment communicating with each other via a common channel commonly used by multiple user equipments and a dedicated channel individually set for each user equipment, said user equipment performing transmission power control for causing a transmission power in said base station to change based on a reception quality of a data transfer channel in the dedicated channel,
wherein said transmission power control method comprises in said user equipment:
a common channel reception quality measurement step of measuring a reception quality of a channel in which a predetermined code is continuously transmitted, among said common channel;
a stand-alone state detection step of detecting whether or not there is a stand-alone communication state in which the data transfer channel in the dedicated channel has not been set and control information is transmitted and received only via a control channel in the dedicated channel; and
a stand-alone-period transmission power control step of, if said stand-alone communication state has been detected in said stand-alone state detection step, performing transmission power control corresponding to the common channel for causing the transmission power in said base station to change based on the reception quality of the common channel measured in said common channel reception quality measurement step, and wherein said transmission power control method comprises in said base station:

a transmission power changing step of changing the transmission power of the dedicated channel with respect to said user equipment, depending on the transmission power control performed by said user equipment.

12. The mobile communication system according to claim 2, wherein said common channel reception quality measurement means measures a reception quality of a common pilot channel as said common channel.

13. The mobile communication system according to claim 2, wherein said common channel reception quality measurement means measures a received RSCP as the reception quality of said common channel.

14. The mobile communication system according to claim 3, wherein said common channel reception quality measurement means measures a received RSCP as the reception quality of said common channel.

15. The mobile communication system according to claim 2, wherein said common channel reception quality measurement means measures a received Ec/NO as the reception quality of said common channel.

16. The mobile communication system according to claim 3, wherein said common channel reception quality measurement means measures a received Ec/NO as the reception quality of said common channel.

17. The mobile communication system according to claim 2, wherein said common channel reception quality measurement means measures a received bit error rate as the reception quality of said common channel.

18. The mobile communication system according to claim 3, wherein said common channel reception quality measurement means measures a received bit error rate as the reception quality of said common channel.

19. The mobile communication system according to claim 2, wherein said common channel reception quality measurement means measures a received SIR as the reception quality of said common channel.

20. The mobile communication system according to claim 3, wherein said common channel reception quality measurement means measures a received SIR as the reception quality of said common channel.

* * * * *